June 21, 1966   A. DRITZ   3,257,254
FASTENING METHOD AND APPARATUS
Filed April 6, 1962   2 Sheets-Sheet 1
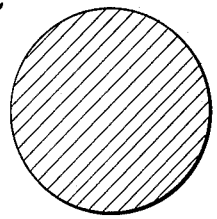
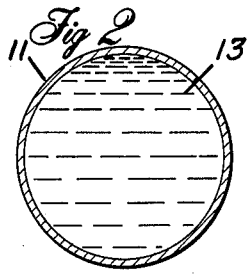
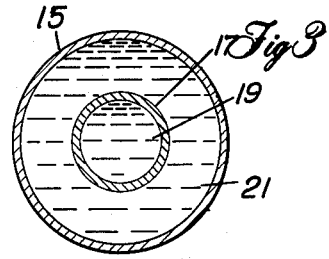
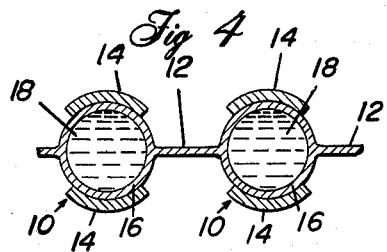
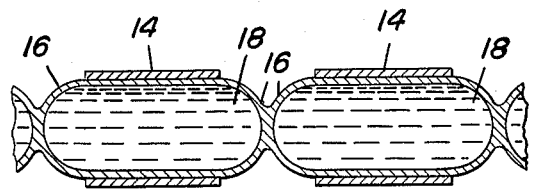
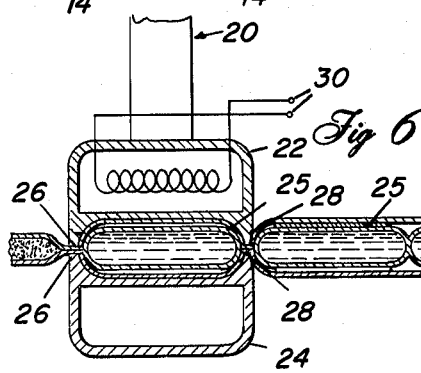
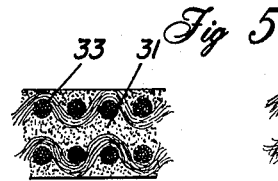
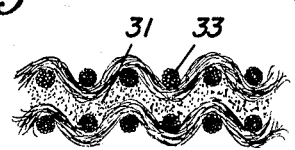
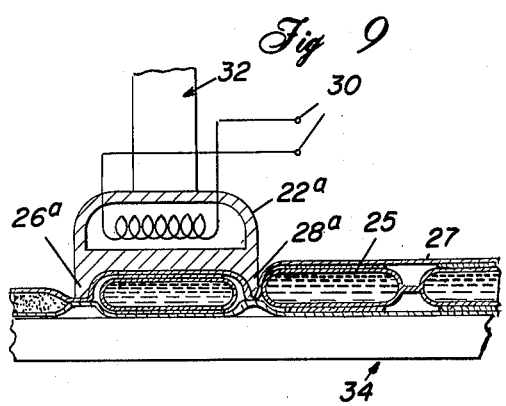
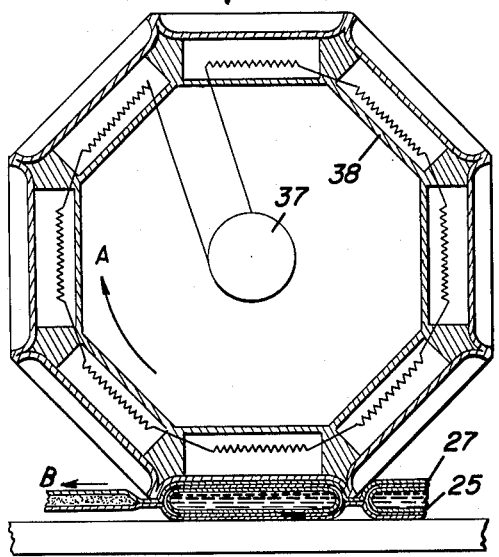

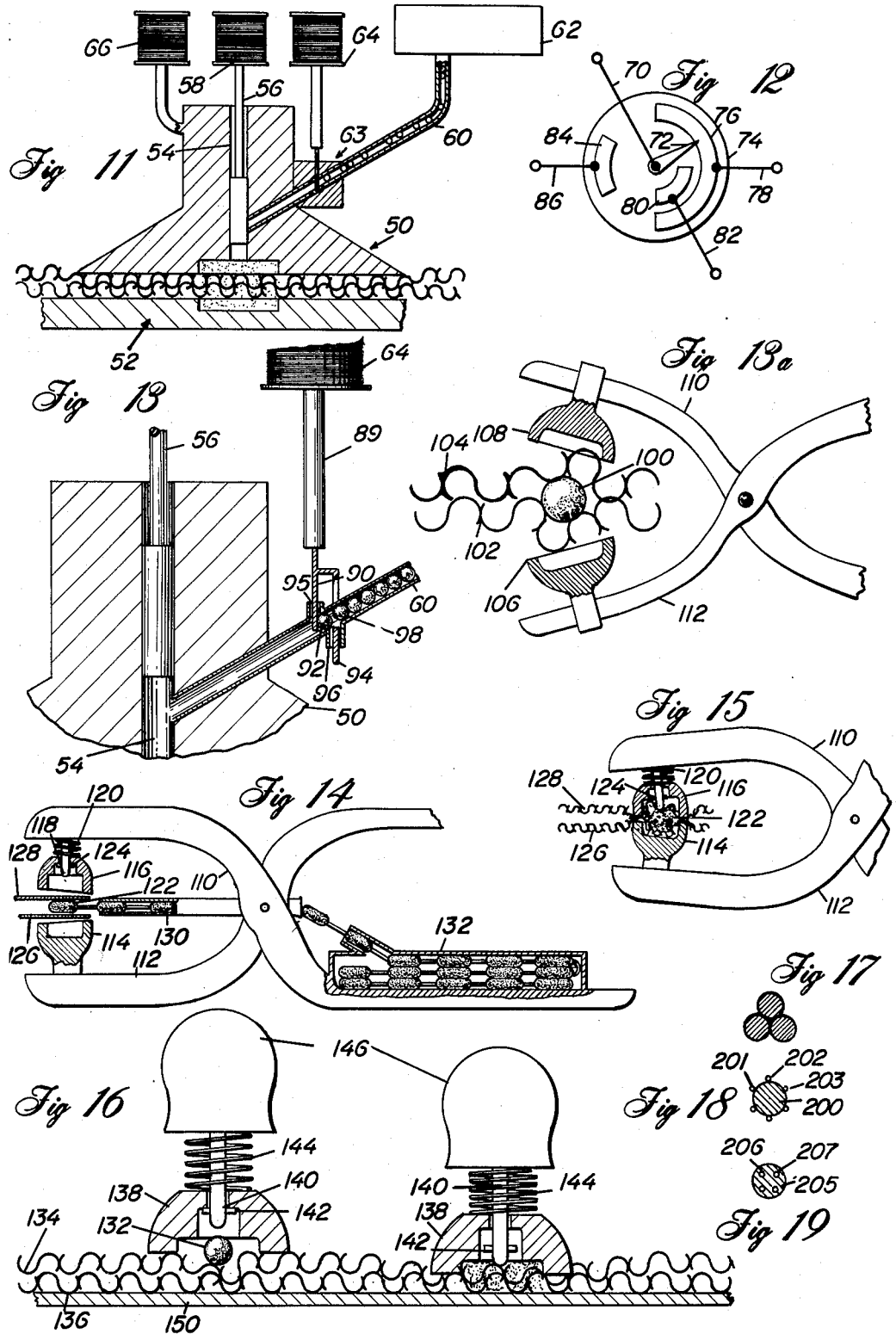

United States Patent Office

3,257,254
Patented June 21, 1966

3,257,254
FASTENING METHOD AND APPARATUS
Arthur Dritz, 171 Beach at 125th St.,
Rockaway Park, N.Y.
Filed Apr. 6, 1962, Ser. No. 185,712
12 Claims. (Cl. 156—291)

This invention relates to the art of fastening together sheets or layers of material, especially flexible or yieldable materials such as fabric, paper, felt and other fibrous materials, metal foil and the like; in fact any material that can be sewed.

The general object of the invention is to provide an improved method and apparatus for fastening two or more sheets of material together utilizing increments of adhesive material. More specific objects and advantages will become more apparent after reading the attached description in conjunction with the attached drawings.

In its broader aspects the present invention relates to an improved apparatus for fastening together two or more layers of material with a seam of adhesive material which comprises in combination:

(a) Feed means for placing inactive increments of adhesive material along a desired seam path between two layers of material,
(b) Compression and confinement means for compressing the material on both sides of the seam so as to laterally confine the flow of adhesive in the seam area,
(c) Means to convert the inactive adhesive increments to an active form while said increments are laterally confined within the seam area.

Referring now to the drawings:

FIGURE 1 is a cross sectional view of an increment of solid adhesive;

FIGURES 2 and 3 are cross sectional views of two other types of adhesive increments in accordance with this invention;

FIGURES 4 and 5 are cross sectional views of groups of adhesive increments in accordance with this invention;

FIGURE 6 is an elevation illustrating one embodiment of the invention;

FIGURES 7 and 8 are section views illustrating different seams which can be made in accordance with the invention;

FIGURE 9 illustrates another embodiment of the invention;

FIGURE 10 illustrates still another embodiment of the invention;

FIGURE 11 illustrates another embodiment of the invention;

FIGURE 12 illustrates an alternative feed arrangement for the embodiment shown in FIGURE 11;

FIGURE 13 illustrates a cross sectional view of an alternative valving arrangement for the embodiment shown in FIGURE 11;

FIGURE 13a shows a fragmentary view of a simpler embodiment of the invention utilizing a plier type arrangement;

FIGURES 14 and 15 are fragmentary side views of slightly different jaw type arrangements in accordance with this invention;

FIGURE 16 illustrates still another simple embodiment of the invention utilizing cup-shaped members;

FIGURES 17, 18 and 19 illustrate different arrangements whereby the adhesive increments may be incorporated within or upon the threads of the material itself.

As can be gathered from the above broad statement of the invention, this invention involves the use of increments of adhesive. These increments may suitably take many forms. A few of the possible forms are illustrated in FIGURES 1–5.

FIGURE 1 represents a cross sectional view of a solid pellet of adhesive in an "inactive" form and which is, for example, activated by heat. When the heat is applied the adhesive becomes liquid and when it is removed then the adhesive returns to its solid condition.

FIGURE 2 represents an adhesive increment having a solid outer envelope 11 which confines a liquid or semi-liquid interior 13. This type of adhesive increment is in its "inactive" form and can be "activated" by the application of sufficient pressure to the envelope 11 to rupture same and liberate the liquid adhesive 13 contained therein. The liquid adhesive is designed to either "set" rapidly when exposed to air or heat.

FIGURE 3 represents still another possible type of adhesive increment comprising an outer envelope 15 and an interior envelope 17. The interior envelope 17 contains one liquid adhesive component 19 and the area between the envelopes 15 and 17 is filled with another liquid adhesive component 21. As shown, the entire adhesive increment is in its 'inactive" form but when the envelopes 15 and 17 are ruptured the liquid contents 19 and 21 intermix and thereby form an "active" adhesive. This type of arrangement is particularly useful in connection with epoxy-type resins wherein one of the adhesive components (e.g. 21) could be the epoxy component and the other liquid component (e.g. 19) could be the curing agent for the epoxy component. Such combinations are well known in the resin art and need not be further explained here.

The size of the individual adhesive increments may vary considerably (for example from a few microns to as large as a quarter of an inch or more in diameter). The size will depend upon the particular fastening job under consideration, the type of material to be fastened together, the type of adhesive, etc.

The interior liquid adhesive (e.g. 13 in FIGURE 2) could comprise acetone and while the acetone itself does not strictly act as an adhesive it could so act if the outer envelope was made of cellulose acetate and the two permitted to interact. For instance, if this combination was employed, the shell 11 of FIGURE 2 would be composed of cellulose acetate and the interior portion of this shell would be coated with some material which would prevent reaction between the liquid acetone 13 and the cellulose acetate until such time as the entire bead was crushed, heated or otherwise brought into contact with the acetone.

Alternatively, the solid envelope could be composed of some very thin material (such as zytel, vinyl or nylon) which could be tacky or adhesive enough to serve as a semi-permanent adhesive means. The interior liquid adhesive material 13 could then be a permanent adhesive material such as silicone, epoxy, polyvinylchloride or other similar resinous material which would cure at room temperature.

The type of adhesive itself is not critical to this invention but those adhesives which are inexpensive and which when activated rapidly "set" are especially preferred.

The adhesive increments in accordance with this invention can either be entirely separate increments or the increments can be interconnected in groups of two or more. Grouping of the increments in strings or beads has certain advantages for many applications and often facilitates alignment of the adhesive increments along a desired seam path. Examples of some arrangements for grouping adhesive increments are shown in FIGURES 4 and 5. For example, in FIGURE 4 adhesive beads 10 are interconnected by means of links 12. As shown, the outer surface of each adhesive bead 10 can be provided with a layer or coating of a pressure sensitive adhesive 14.

This pressure sensitive material facilitates the placement and retention of the beads at a given location or line along or between two layers of fabric. The pressure sensitive adhesive bond is not designed to be a particularly strong or permanent one but instead is only designed to hold the beads in place for a short period of time. As can be seen, each of the beads 10 comprises a shell or envelope portion 16 which is preferably rather thin and either easily crushable by pressure or easily fusible by means of thermal or electrical energy. Within the interior of shells 16 there is a liquid adhesive 18.

While the adhesive increments can suitably be in the spherical forms shown in FIGURE 4 it will be appreciated that they can also be in the form of oblong envelopes as shown in FIGURE 5. It will be further noted that a difference between FIGURE 4 and FIGURE 5 is that the links 12 are omitted in FIGURE 5 and the ends of adjacent increments are merely in contiguous abutting relationship with each other.

FIGURE 6 is an illustration of an arrangement which could be used in accordance with the teachings of this invention. This figure shows a string of adhesive beads 25 interposed between two layers of cloth 27 and 29. A tool 20 is also shown and is seen to comprise an upper member 22 and a lower member 24, each of which have inwardly turned lateral edge portions (26 and 28 respectively) which more or less act as gaskets to compress the spaced apart portions of fabric therebetween and to also confine any lateral movement of the adhesive to the area between the two compressed portions. In this particular embodiment the upper member 22 of tool 20 contains heating means 30 for liberating and/or "activating" the adhesive within the adhesive increments 25 located between edge portions 26 and 28. Instead of electrical means 30, some pressure means might be provided so as to cause the individual adhesive increments to be ruptured and the adhesive liberated or "activated." Specifically, ridges might be employed on the under surface of the tool 20 so as to cause a pressure or pinching action against the adhesive increments 25 located therebeneath in order to liberate and/or activate the adhesive.

When utilizing an arrangement such as is shown in FIGURE 6 the thickness of the adhesive seam may be varied as desired. This variation can be achieved either by appropriately shaping the compression and confinement means or by controlling the amount of adhesive which is to be activated. FIGURE 7 shows a cross sectional view of adhesive and threads wherein the adhesive 31 completely covers all sides of the threads 33 so that the seam would be quite apparent. FIGURE 8 shows a somewhat different arrangement wherein the adhesive is applied lightly and would only cover a portion of the threads 33. FIGURE 7 could therefore be considered as an "external" stitch and FIGURE 8 as an "internal" stitch.

FIGURE 9 shows another tool 32 which is adapted to act upon and restrict the lateral movement of the adhesive increments therebeneath. The primary difference between this tool and the tool 20 of FIGURE 6 is that there is no bottom member to the tool 32 corresponding to the bottom member 24 of FIGURE 6. In FIGURE 9 there is only an upper member and a flat table or other flat surface 34 could in effect adequately serve as the lower half of the tool.

FIGURE 10 generally illustrates an alternative arrangemnt for a tool wherein the tool is actually multi-headed and is adapted to roll along upon the surface of the layers of fabric to be joined together. Such a wheel type of tool 36 might well be attached to conventional sewing machines. Heating wires 38 are shown on the interior of the wheel. The wheel can be designed to rotate about shaft 37 and as it rotates (in the direction of arrow A) the layers of fabric could be moved in the direction indicated by arrow B by virtue of the downward pressure of the tool 36 upon the layers of fabric. If desired, a means for feeding the adhesive increments between the layers of fabric could be operatively asociated with the tool 36 prior to the time that the tool 36 rolled over the fabric and liberated the adhesive.

Further with regard to FIGURE 10 those skilled in the art will appreciate that the tool 36 could contain appropriate commutator means associated with the various heating wires 38 so that each segment of the heating wire would only come into operation at the lowermost position of the wheel as the wheel rotated. Those skilled in the art will also understand that instead of using a heating means 38 in order to liberate the adhesive material, equivalent pressure means might just as well be employed.

It has been found that in connection with the fastening together of layers of material with adhesives (and particularly textile fabrics) that some adhesives are only capable of resisting water treatment whereas other adhesive materials will not resist water treatment but will resist dry cleaning treatment. To take care of this situation it is contemplated that the alternate increments of adhesive applied in accordance with this invention could be arranged to have different properties. For example if a string of adhesive increments is used (such as is shown in FIGURE 4 or 5), one increment could contain an adhesive resistant to water and the increment on each side of it could contain an increment resistant to dry cleaning materials. Materials fastened together with a string of such adhesive increments could therefore be suitably treated with either water or dry cleaning fluids.

Another embodiment in accordance with this invention is shown in FIGURE 11. In this figure it will be seen that there is provided an upper die member 50 and a lower die member 52. The upper die member has a central vertical channel or passageway 54 within which a plunger 56 which is adapted to reciprocate vertically. Vertical reciprocation can be achieved in a number of ways, as for example with the aid of a solenoid 58. A feed conduit 60 connects an adhesive increment reservoir 62 with the aforementioned vertical channel or passageway 54. A suitable valving means is provided in conduit 60, as for example a valve means 63 actuated by solenoid 64. The upward and downward movement of the upper die 50 can also be mechanically actuated, as for example by a solenoid 66.

In operation the system shown in FIGURE 11 preferably is more or less governed by the action of a control arrangement such as is shown in FIGURE 12.

In FIGURE 12, 70 represents a source of power and 72 a switch connected to said power. The switch 72 is adapted to rotate clockwise around the face of housing 74. As the switch 72 rotates in a clockwise fashion it will first of all come into contact with contact segment 76 which is electrically connected through line 78 to the solenoid 66 which governs the vertical movement of die member 50. As the switch 72 continues to move in a clockwise direction it will soon simultaneously contact segments 76 and 80. 80 is connected by means of lead 82 to the solenoid 58 governing the movement of plunger 56. The adhesive increments will have been previously positioned in the desired location on or in the seam, and preferably stay there in an "inactive" state until the die member 50 moves downwardly and until the plunger 56 moves downwardly. When the plunger 56 does move downwardly it will rupture the adhesive increments which are located within the lateral confines of the die member 50. The adhesive will quickly "set" and a seam will thus be formed.

When the switch 72 reaches the six o'clock position it will discontinue contact with segments 76 and 80 which will cause the die member 50 and plunger 56 to rise. As the switch 72 continues to rotate it will eventually come in contact with segment 84 which is operatively connected to solenoid 64 by means of wire 86. When solenoid 64 is actuated it opens the valve 63 in the conduit 60 and permits the desired number of adhesive increments to flow into the area to be seamed. When the switch 72 has continued to rotate until it no longer contacts segment 84 then the solenoid 64 will be de-energized and the valve 63 in the conduit 60 will be closed, thus preventing further flow of adhesive increments. Of course, during the time that adhesive increments are flowing through conduit 60 into the seam area the plunger 56 will be in its raised position so as not to obstruct such flow.

FIGURE 13 illustrates an alternative valving arrangement for the arrangement shown in FIGURE 11. In FIGURE 13 the die member 50 is shown in fragmentary fashion as is the plunger 56. Also, the solenoid 64 and the conduit 60 are shown to be about the same as in FIGURE 11. The primary difference is that the conduit valving arrangement in FIGURE 13 permits one adhesive increment to be passed through the conduit 60 at a time. In this arrangement, when the solenoid 64 is actuated, solenoid arm 89 rises, which in turn lifts front valve member 90 in an upward direction and in so doing an adhesive increment 92 is permitted to roll downwardly along conduit 60. However, at the same time that front valve member 90 rises, rear valve member 94 also rises because both valve members 90 and 94 are connected to arm 89. Valve member 94 is located below the conduit 60 and slides within a slot 96 just as member 90 is adapted to slide within slot 95. When the valve member 94 rises to its uppermost position it would prevent adhesive increment 98 and those behind it from following downwardly after increment 92. When valve member 90 drops downwardly again, lower valve member 94 will simultaneously drop and adhesive increment 98 will then fall into the position previously occupied by adhesive increment 92. Such an arrangement permits individual increments of adhesive to be fed to the area to be joined. By suitable actuation of the solenoid 64, any number of individual adhesive increments can thus be fed to the area to be seamed.

FIGURE 13a shows an even simpler embodiment of the invention wherein an adhesive bead 100 is interposed between two layers of cloth 102 and 104 and then ruptured to liberate the adhesive within a confined area formed by the peripheries of cooperating upper and lower jaw members 106 and 108 respectively. Jaw members 106 and 108 are quite similar in shape and function to members 24 and 28 of FIGURE 6. Jaw members 106 and 108 are screwed, bolted or otherwise fastened adjacent the ends of plier jaw members 110 and 112. The shape of members 106 and 108 laterally confine the liberated adhesive.

FIGURES 14 and 15 are slightly different than FIGURE 13a in that while the jaw members 114 and 116 are similar in shape and function, the upper one (116) is spring mounted on a post 118 by means of spring 120 so that when members 114 and 116 are brought together (as in FIGURE 15) the result is that post 118 functions to rupture the adhesive bead or beads 122 which lie between jaw members 114 and 116 while the peripheries of members 114 and 116 laterally confine the liberated adhesive. Member 116 is retained on post 118 by means of a collar 124. FIGURES 14 and 15 are essentially the same except for the relative position of members 114 and 116 to each other and to the layers of cloth 126 and 128. FIGURE 14 further differs in that it shows a tubular feed means 130 and a feed magazine 132 which might be used in conjunction with the tool in order to facilitate feeding of the beads 122 to or between the two layers of cloth (126 and 128) or other material. Such a feed means and feed magazine could obviously take many forms.

FIGURE 16 illustrates still another simple embodiment of the invention, wherein one or more adhesive beads 132 of the type previously described are positioned on (or between) two layers 134 and 136 of material to be fastened together. Cup-shaped member 138 is then placed over the bead or beads 132 so that the peripheral edges of the cup-shaped member 138 effectively laterally confine the adhesive once it has been liberated. The two positions shown in FIGURE 16 illustrate how a spring positioned bead rupturing member 140 is limited in its upward movement by collar 142 and in its downward movement by spring 144. When the head 146 is manually depressed downwardly it will be seen that this simultaneously (a) presses the peripheral edges of cup-shaped member 138 toward the base 150 so as to compress the layers of material and laterally confine liberated adhesive and (b) liberates the adhesive in bead 132 so that it can function to bond the two layers of material together.

FIGURE 17 illustrates another embodiment of the invention and is a cross sectional view of three threads which are interwined. Each of the threads preferably has a different chemical composition so that when an "activating means" (such as heat, pressure, electronic beams, etc.) is applied to a localized area of the threads, one or more of the three threads can interact and form a liquid or semi-liquid bonding material which will then enable adjacent intertwined threads to be bound together.

FIGURE 18 illustrates another embodiment of the invention and is a cross sectional view of a single thread 200 having a plurality of small increments or spheres (e.g. 201, 202, 203) attached to its outer periphery. When these increments are "activated" (such as by heat, pressure, electronic beams, etc.) they can either liberate adhesives themselves, interact with each other to form an adhesive or interact with the thread 200 in order to form an adhesive or bonding agent (e.g. acetate thread and small increments or capsules of acetone).

FIGURE 19 illustrates another embodiment of the invention wherein a sponge-like thread 205 contains within it a plurality of increments or spheres (206, 207) which when "activated" (such as by heat, pressure, electronic beams, etc.) can either liberate adhesives themselves, interact with each other to form an adhesive or interact with the thread 205 in order to form an adhesive or bonding agent.

In conclusion, while the foregoing specification and drawing describe the construction, operation and use of preferred embodiments of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the appended claims.

What is claimed is:

1. An improved method for fastening together two outer layers of fibrous non-thermoplastic material by means of an intermediate seam of flowable adhesive material positioned therebetween which comprises in combination:
   (a) placing inactive increments of adhesive material along a desired seam path between two layers of said fibrous non-thermoplastic material,
   (b) compressing and confining the said fibrous non-thermoplastic material on both sides of the seam and above and below said increments so as to laterally confine the flow of adhesive within the seam area, and
   (c) converting the inactive adhesive increments to an active form while said increments are laterally confined within the seam area.

2. A method according to claim 1 wherein said inactive increments of adhesive material are in the form of capsules.

3. A method according to claim 1 wherein a plurality of said capsules are connected together in bead-like fashion.

4. A method according to claim 2 wherein said capsules consist of concentric envelopes containing different liquid adhesive components.

5. A method according to claim 2 wherein said capsules are provided with a coating of a pressure sensitive adhesive.

6. A method according to claim 1 wherein said increments of adhesive material comprise an epoxy resin.

7. A method according to claim 1 wherein the inactive adhesive is converted to the active form by heat.

8. An improved apparatus for fastening together two layers of fibrous non-thermoplastic material by means of an intermediate seam of flowable adhesive material which comprises in combination:
 (a) feed means for placing inactive increments of adhesive material along a desired seam path between two layers of said fibrous non-thermoplastic material,
 (b) compression and confinement means for directly compressing said fibrous non-thermoplastic material on opposite sides of the seam so as to laterally confine the flow of adhesive within the seam area,
 (c) means located adjacent the compression and confinement means to convert the inactive adhesive increments to an active form while said increments are laterally confined within the seam area.

9. An apparatus according to claim 8 wherein said compression confinement means consists of two spaced apart longitudinally extending side walls with a sufficient space between said walls to accommodate the desired seam.

10. An apparatus according to claim 8 wherein said means to convert the adhesive comprises a reciprocating weighted plunger.

11. An apparatus according to claim 8 wherein said means to convert the adhesive comprises heating means.

12. An apparatus according to claim 8 wherein said feed means comprise a channel opening into the area provided by the compression and confinement means.

References Cited by the Examiner

UNITED STATES PATENTS

| | | | |
|---|---|---|---|
| 2,621,139 | 12/1952 | Messing | 156—290 |
| 2,679,572 | 5/1954 | Workman | 156—582 XR |
| 2,804,419 | 8/1957 | De Waskin et al. | 156—290 |
| 3,033,160 | 5/1962 | Steidinger | 156—548 |
| 3,138,695 | 6/1964 | Bracich | 219—244 |

FOREIGN PATENTS 567,011   12/1932   Germany.

EARL M. BERGERT, *Primary Examiner.*

R. I. SMITH, M. L. KATZ, *Assistant Examiners.*